3,311,693
DEVICE FOR SUSPENDING A CONSUMABLE ELECTRODE AND SUPPLYING A MELTING CURRENT THERETO

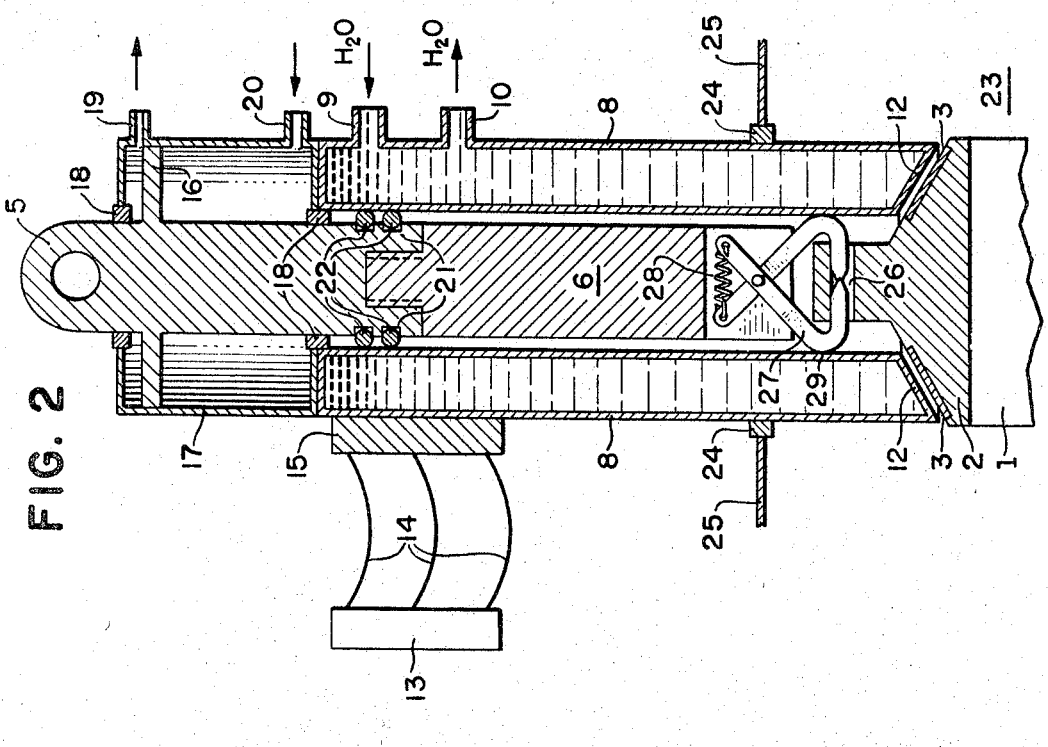
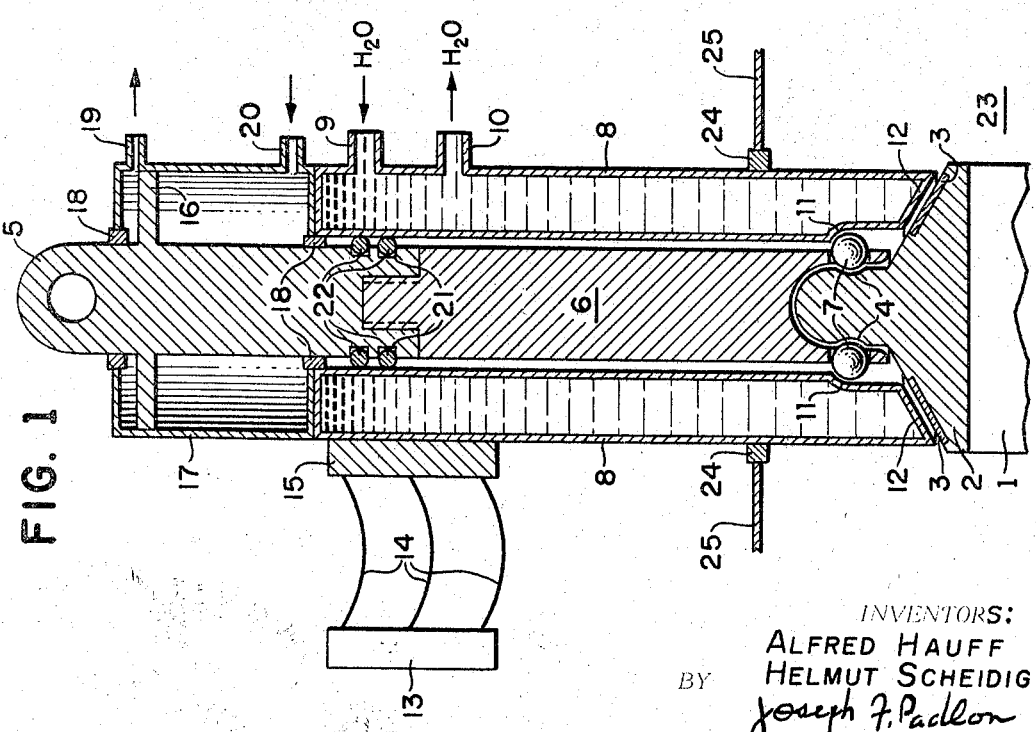

Alfred Hauff, Bruchkobel, and Helmut Scheidig, Hanau am Main, Germany, assignors to W. C. Heraeus G.m.b.H., Hanau am Main, Germany, a German firm
Filed Dec. 17, 1963, Ser. No. 331,170
Claims priority, application Germany, Dec. 20, 1962, H 47,756
10 Claims. (Cl. 13—15)

The present invention relates to a device for safely suspending a consumable electrode into an arc furnace and especially a vacuum arc furnace, and for supplying the melting current thereto.

The proper operation of an arc furnace, and especially a vacuum arc furnace in which the metal to be melted is supplied in the form of a consumable electrode, depends primarily upon a safe suspension device for the consumable electrode and a proper supply of the melting current to this electrode. That this problem is not to be taken lightly may be seen by the fact that consumable electrodes, each of which is melted in one operation, have a very considerable weight amounting, for example, from 10 to about 50 tons, and that the melting current which is supplied to such a consumable electrode amounts from 10,000 to 30,000 amperes.

In the vacuum arc furnaces of conventional designs the consumable electrode is suspended and supplied with current by being welded upon a stub which is secured by means of a supporting head in the form of a clamp to the electrode suspension rod which also serves as a means for supplying the melting current to the consumable electrode.

Such a supporting head should comply with a number of very important requirements which, however, were not fully attained by the clamp-like heads which have previously been employed.

It is one of the most important objects of the present invention to provide a supporting and locking head for a consumable electrode which is fully capable of carrying the heavy load of the electrode and transmitting it safely to the electrode suspension rod and also of insuring a perfect transmission of the required melting current from the electrode suspension rod to the stub carrying the consumable electrode.

Another important object of the invention is to provide such a supporting and locking head which is designed so as to permit it to be easily and quickly tightened and loosened so that the inoperative period of the arc furnace may be made as short as possible.

A further object of the invention is to provide a supporting and locking head which will not be loosened accidentally, for example, when during the operation of the furnace the consumable electrode is lowered unintentionally so far into the furnace that it rests with its full weight on a solid base or when it is so rested intentionally during the normal operating procedure for the purpose of welding it to the stump within the furnace.

Numerous attempts have already been made to attain these objects. However, none of the known devices for suspending the consumable electrode and for supplying the required melting current thereto through the suspension device has been capable of fully complying with all of these requirements. This is partly due to the fact that the high melting current causes the points of connection and thus the entire suspension device to be heated to very high temperatures which in turn may cause the conventional securing means, such as screw connections or pressure connections to be loosened. Thus, these prior devices do not insure a reliable suspension of the consumable electrode and a reliable supply of the melting current thereto. There have been other suspension devices in which the consumable electrode is secured by the clamping action of wedges or wedge-shaped segments through which the melting current is also supplied. These devices have the same disadvantages as mentioned above. Furthermore, these devices usually either do not exert a sufficient grip upon the consumable electrode to carry the weight thereof reliably which may amount to several tons or, once being applied, it is extremely difficult or even impossible to loosen and remove them again from the consumable electrode. All of these conventional securing means have the further disadvantage that, when clamped to the consumable electrode or the stump which is welded to the electrode, they never insure that the very important requirement that the electrode or stump will extend exactly coaxially to the electrode suspension rod will be fulfilled.

The device according to the invention for suspending and securing a consumable electrode which is preferably rigidly mounted on a stump, and for providing a reliable connection thereto of the current supply means overcomes all of the above-mentioned disadvantages of the known suspension and connecting means by mounting the consumable electrode on the electrode suspension rod by means of a supporting and locking head which is removably secured to the suspension rod and is provided at its end facing the consumable electrode with locking means for removably securing it to the electrode or its connecting stump, and by providing separate means for supplying the melting current to the consumable electrode which means enclose the supporting head and a considerable part of the suspension rod and are movable relative to the suspension rod. According to a preferred embodiment of the invention the current supply means comprise a tubular cylindrical element with inner and outer walls and connections for passing a cooling medium into and from the cooling chamber which is formed between these walls. At its lower end facing the consumable electrode, this current supply element is made of a conical or roof-like shape with the cone or roof preferably converging upwardly.

One of the important advantages of the device according to the invention is the fact that the suspension and securing means of the consumable electrode which have to take up the load of the latter are separate from the current supply means and are therefore not employed for transmitting the melting current to the electrode. Thus, there is no longer the danger as in the previous devices of this kind that the securing means for the electrode might loosen by being strongly heated or when the electrode is set upon a stationary object. The current supply means may now be moved independently of the suspension means, and the electric connection between the current supply means and the consumable electrode or the connecting stub to which it is secured may be effected in accordance with the electric load by an auxiliary force which may be produced, for example, by pneumatic or hydraulic means. The inventive design of the current supply element on the end of the device which is adapted to be connected to the stub on the consumable electrode permits these parts to be provided with large electric contact surfaces which insures that the high melting currents will be properly transmitted to the consumable electrode. The device according to the invention therefore insures a safe and reliable suspension of the consumable electrode and a proper connection of the current supply means to the electrode even if this electrode is extremely heavy and the melting currents are very high.

These as well as additional features and advantages of the present invention will become more clearly apparent from the following detailed description thereof which is to be read with reference to the accompanying drawings, in which—

FIGURE 1 shows a longitudinal section of the device according to the invention; while FIGURE 2 shows a similar view of a modification of this device.

As illustrated in FIGURE 1 of the drawings, the consumable electrode 1 is rigidly secured, for example, welded, to a connecting stub 2. The upper side of this stub 2 is made of a conical shape and a considerable part of the conical side is provided with one or more contact surfaces 3. The central connecting end of the stub is provided with an annular groove 4. The consumable electrode 1, 2 is secured to and suspended on an electrode suspension rod 5 by means of a supporting and locking head 6 which is rigidly secured to the suspension rod 5, for example, by being screwed into the latter. The lower end of the supporting head 6 is made of a shape so as to receive the projecting connecting end of the stub 2 and it is further provided with locking means which in the embodiment according to FIGURE 1 consist of balls 7. When the current supply element 8 is moved downwardly these balls 7 slide along the arched or cam-shaped lower inner surface 11 of the element 8 and are thereby pressed into the annular groove 4. The current supply element 8 has a tubular cylindrical shape with outer and inner walls which are spaced from each other to form a cooling chamber which is provided on the outer wall with an inlet 9 and an outlet 10 for circulating a cooling medium, for example, water, through this cooling chamber. By designing the current supply element 8 in this manner, this element itself as well as the lower part of the suspension rod 5, the supporting head 6, the conical contact surfaces 3 and 12, and the cooperating parts 4, 7, and 11 of the locking means are protected from being excessively heated by the transmission of the melting current, and the locking means are also protected from being soiled, for example, by splashing metal. The melting current is supplied to the element 8 from a current supply unit 13 through conductors 14 and a connecting member 15. Due to the weight of the current supply element 8 and the large column of cooling water therein, the conical contact surfaces 12 on the lower end of the element 8 are pressed firmly upon the corresponding contact surfaces 3 on the electrode stub 2 so that a reliable electric connection to the consumable electrode is always insured. Furthermore, the upper part of the electrode suspension rod 5 has a piston-shaped flange 16 which is surrounded by a cylindrical housing 17 which is rigidly connected to the current supply element 8 and tightly sealed and electrically insulated from the suspension rod 5 by sealing means 18 and provided with two connections 19 and 20 for passing a liquid or compressed air into and out of the housing 17 for the purpose of moving the suspension rod hydraulically or pneumatically relative to the current supply element 8. An actuator is thus provided, by which is meant a servomechanism operable by fluid pressure here denominated hydraulic, by which is intended both liquid and gaseous operating media, the said actuator responding to applied hydraulic pressure to lock and release the supporting head 6 on the electrode stub 2 and simultaneously force the current supply element 8 into high pressure, low resistance, electrical contact with electrode stub 2. The lower part of the suspenison rod 5 is provided with grooves 21 in which sealing means 22 are mounted for hermetically sealing the suspension rod 5 relative to the inner wall of the current supply element 8 and also for electrically insulating these two parts from each other. The lower part of the suspension and current supply unit according to the invention is located in the evacuated furnace chamber 23 of a vacuum arc furnace. During the melting process, this unit except its upper part is gradually lowered into the furnace chamber 23 of the arc furnace through the wall 25 of the furnace head relative to which it is sealed by sealing means 24. Insulation of the current supply element 8 from the furnace wall 25, is also provided by the sealing means 24, so that said element 8 is in complete electrical isolation while joining conductors 14 to stub 2. Such means 24 may comprise any known resilient insulating sealant having high temperature stability and a low coefficient of friction, such as a packing ring of intermingled fibers of asbestos and polytetrafluoroethylene, or of flexible ceramic fibers impregnated with a suitable silane polymer, for example.

The modification of the invention as illustrated in FIGURE 2 differs from the embodiment according to FIGURE 1 merely by the structure of the locking means for securing the connecting stub 2 to the supporting head 6. In this case, the head of stub 2 is provided with an eye 26 into which a pair of hooks 27 engage which are pivotably mounted and are forced apart by a spring 28 when the current supply element 8 is in the raised inoperative position. When the stub 2 on a consumable electrode 1 is then inserted between the hooks 27 and the element 8 is lowered, the lower end of the latter will press the free ends of the hooks toward each other and into the eye 26, and by the engagement of the back of the hooks with the lower end of the inner wall 29 the stub will be locked securely to the supporting head 6 on the suspension rod 5.

As will be evident from the drawings, the particular construction of the electrode suspension device according to the invention has the following further important advantage.

Since the connecting head of stub 2 is located coaxially to the consumable electrode 1 and this head is gripped by the locking means 7 or 27 when it first engages with the element 8 and is not rigidly locked to the latter until it is further inserted therein, the electrode 1 will by its own weight be centered when it is first being lifted. Thus, there is no need as in the known electrode suspension means to adjust the electrode so as to extend exactly coaxially to the suspension rod before it is secured thereto. This automatic centering of the consumable electrode has the further advantage that the contact surfaces 3 and 12 will be in the proper position relative to each other so as to engage fully with each other when the current supply element 8 is lowered as far as possible. This construction of the suspension means facilitates considerably the operation of charging an arc furnace with a new consumable electrode.

In some cases it may be advisable to reverse the arrangement, for example, in such a manner that the current supply means are centrally located and the suspension device for the consumable electrode is arranged concentrically around these means.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A device for suspending a consumable electrode which has a terminal stub of reduced diameter comprising a reentrant portion for lifting engagement in an arc furnace and for supplying the melting current thereto comprising an electrode suspension rod, a supporting head rigidly secured to said suspension rod, locking means on the lower end of said supporting head comprising at least one stub locking member mounted in said supporting head for radial inward locking movement during continuous longitudinal constraint with respect to said supporting head adapted to lock said supporting head to the upper end of the consumable electrode, and actuator means comprising current supply means separate from and surrounding said supporting head and a considerable part of said suspension rod and movable relative thereto so as to engage with said electrode to supply the melting current thereto and having a lower extremity which includes an interior cavity portion shaped to slidingly engage with and urge into radially inward stub locking motion in said reentrant portion the said at least one stub locking member upon movement by the supporting head, upwardly into the said current supply means.

2. A device as defined in claim 1, wherein said actuator means further comprises fluid-controlled means for moving said current supply means relative to said electrode suspension rod so as to press said current supply means against said consumable electrode.

3. A device for suspending a consumable electrode for an arc furnace and for supplying the melting current thereto comprising an electrode suspension rod, a supporting head rigidly secured to the lower end of said suspension rod, locking means on the lower end of said supporting head adapted to lock said supporting head to a connecting stub on the upper end of the consumable electrode, and current supply means including a hydraulic actuator separate from and extending coaxially to and surrounding said supporting head and a considerable part of said suspension rod and movable relative thereto so as to engage with said connecting stub to supply the melting current to said electrode and to engage with and lock said locking means.

4. A device for suspending a consumable electrode for an arc furnace and for supplying the melting current thereto comprising an electrode suspension rod, a supporting head rigidly secured to the lower end of said suspension rod, locking means on the lower end of said supporting head adapted to lock said supporting head to a connecting stub on the upper end of the consumable electrode, and current supply means including a hydraulic actuator, separate from said supporting head and said suspension rod and comprising a tubular cylindrical element extending coaxially to and surrounding said supporting head and a considerable part of said suspension rod and movable relative thereto and adapted when moved toward said connecting stub to engage with said locking means to lock the same to said connecting stub and when further moved toward said connecting stub to engage with said connecting stub to supply the melting current to said electrode.

5. A device for suspending a consumable electrode for an arc furnace and for supplying the melting current thereto comprising an electrode suspension rod, a supporting head rigidly secured to but removable from the lower end of said suspension rod, locking means on the lower end of said supporting head adapted to lock said supporting head to a connecting stub on the upper end of the consumable electrode, and current supply means including a hydraulic actuator, separate from said supporting head and said suspension rod and comprising a hollow tubular cylindrical element extending coaxially to and surrounding said supporting head and a considerable part of said suspension rod and movable relative thereto and adapted when moved toward said connecting stub to engage with said locking means to lock the same to said connecting stub and when further moved toward said connecting stub to engage with said connecting stub to supply the melting current to said electrode, said element having coaxial inner and outer walls spaced from each other to form a cooling chamber, and connecting means on said element for passing a cooling medium into and out of said cooling chamber.

6. A device for suspending a consumable electrode for an arc furnace and for supplying a melting current thereto comprising a connecting stub secured to the upper end of a consumable electrode and a central connecting end projecting from the upper side of said stub, at least one contact surface on said upper side of said stub, an electrode suspension rod, a supporting head rigidly secured to but removable from the lower end of said suspension rod, locking means on the lower end of said supporting head adapted to interengage with said connecting end of said stub so as to lock said supporting head to said connecting end, and current supply means including a hydraulic actuator, separate from said supporting head and said suspension rod and comprising a tubular cylindrical element extending coaxially to and surrounding said supporting head and a considerable part of said suspension rod and movable relative thereto and adapted when moved toward said connecting stub to engage with and slide over said locking means and thereby to lock the same to said connecting end of said stub, said tubular element having a lower end with a contact surface on said lower end adapted to engage with said contact surface on said stub, said lower end of said element having a round shape which is cut away in the center so as to cover said contact surfaces and to protect said surfaces and said locking means from being soiled by dirt and splashed metal particles.

7. A device for suspending a consumable electrode for an arc furnace and for supplying the melting current thereto comprising a connecting stub secured to the upper end of a consumable electrode and having a conical upper side converging upwardly and terminating into a central connecting end, at least one upwardly inclined contact surface on said conical side, an electrode suspension rod, a supporting head rigidly secured to the lower end of said suspension rod adapted to interengage with said connecting end of said stub so as to comprise locking means to lock said supporting head to said connecting end, and current supply means including a hydraulic actuator separate from said supporting head and said suspension rod and comprising a tubular cylindrical element extending coaxially to and surrounding said supporting head and a considerable part of said suspension rod and movable relative thereto and adapted when moved toward said connecting stub to engage with and slide over said locking means and thereby lock the same to said connecting end of said stub, said tubular element having a lower end forming a contact surface tapering inwardly and upwardly at an angle corresponding to the angle of said contact surface on said connecting stub so that said contact surfaces will fully engage with each other when said element is further lowered and to engage with and lock said locking means.

8. A device for suspending a consumable electrode in a vacuum arc furnace and for supplying the melting current thereto comprising an electrode suspension rod, a supporting head rigidly secured to the lower end of said suspension rod, locking means on the lower end of said supporting head adapted to lock said supporting head to a connecting stub on the upper end of the consumable electrode, and current supply means including a hydraulic actuator, separate from said supporting head and said suspension rod and comprising a tubular cylindrical element extending coaxially to and surrounding said supporting head and a considerable part of said suspension rod and movable relative thereto and extending into the furnace through an opening in the top wall thereof and adapted when moved toward said connecting stub to engage with and slide over said locking means and thereby lock the same to said connecting stub, and when further moved toward said connecting stub to engage with said connecting stub to supply the melting current to said electrode, and sealing means intermediate said top wall and said element for electrically insulating said element from said wall and for hermetically sealing said element relative to the side of said opening in said wall.

9. A device as defined in claim 8, further comprising a pair of toroidal sealing means intermediate said suspension rod and said tubular element for hermetically sealing said rod and said element relative to each other.

10. A device as defined in claim 8, further comprising annular spacing and insulative means intermediate said suspension rod and said tubular element for electrically insulating said rod and said element from each other.

References Cited by the Examiner

UNITED STATES PATENTS

| | | | |
|---|---|---|---|
| 2,851,287 | 9/1958 | Tangard | 13—16 X |
| 3,046,319 | 7/1962 | Daley | 13—15 X |

JOSEPH V. TRUHE, *Primary Examiner.*